US010351151B1

(12) United States Patent
Nicholls

(10) Patent No.: US 10,351,151 B1
(45) Date of Patent: Jul. 16, 2019

(54) MODULAR SYNTHETIC TURF STORAGE SYSTEM

(71) Applicant: Mark H. Nicholls, Welland (CA)

(72) Inventor: Mark H. Nicholls, Welland (CA)

( * ) Notice: Subject to any disclaimer, the term of this patent is extended or adjusted under 35 U.S.C. 154(b) by 0 days.

(21) Appl. No.: 15/725,956

(22) Filed: Oct. 5, 2017

Related U.S. Application Data

(63) Continuation-in-part of application No. 15/251,650, filed on Aug. 30, 2016, now Pat. No. 9,809,242.

(60) Provisional application No. 62/212,323, filed on Aug. 31, 2015.

(51) Int. Cl.

| | |
|---|---|
| ***B62B 3/10*** | (2006.01) |
| *E01C 13/08* | (2006.01) |
| *A47B 47/02* | (2006.01) |

(52) U.S. Cl.
CPC ............ *B62B 3/104* (2013.01); *A47B 47/021* (2013.01); *E01C 13/08* (2013.01)

(58) Field of Classification Search
CPC ...................................................... A47B 43/00
See application file for complete search history.

(56) References Cited

U.S. PATENT DOCUMENTS

| | | | | |
|---|---|---|---|---|
| 2,027,265 A | | 1/1936 | Black | |
| 3,931,899 A | | 1/1976 | McAlhaney | |
| 5,165,843 A | | 11/1992 | Hendriks | |
| 5,310,300 A | * | 5/1994 | Crabb | B65G 65/00 198/408 |
| 2003/0218308 A1 | | 11/2003 | Lamson | |
| 2004/0256339 A1 | * | 12/2004 | Welsch | A47B 53/02 211/162 |
| 2006/0091096 A1 | * | 5/2006 | Velez | B62B 3/002 211/194 |
| 2007/0090618 A1 | | 4/2007 | Dube | |
| 2007/0267371 A1 | | 11/2007 | Farley | |
| 2008/0088103 A1 | | 4/2008 | Sloat | |
| 2012/0006930 A1 | | 1/2012 | Mitchell | |

* cited by examiner

*Primary Examiner* — James A Shriver, II
*Assistant Examiner* — James J Triggs
(74) *Attorney, Agent, or Firm* — Harter Secrest & Emery LLP

(57) ABSTRACT

A movable rack system for storing carts or other suitable transports for storing rolls of synthetic turf. Alternatively, the rolls of synthetic turf may be stored directly on the rack systems. A first row of rack systems contains N rack systems. An adjacent row contains N−1 rack systems. The rack systems in the adjacent row can be moved laterally so that access to the first row is available for loading and unloading rack systems contained in that row. In a second moveable rack system, a plurality of satellite hubs rotate about a central hub such that support structures on the satellite hubs are capable of rotating into a loading position and then rotating away from the loading position to a storage position.

13 Claims, 7 Drawing Sheets

900
903
906
909
912
915
918
921
924
927
930
933
936
939
950
955
700
10

525
505A
512
533A
529
508
507A 533A, 533B
534
529

505A
533A
534
508
507A

MODULAR SYNTHETIC TURF STORAGE SYSTEM

TECHNICAL FIELD

The present invention relates generally to the field of synthetic turf, and more particularly to a movable synthetic turf storage and handling system for use in connection with arenas and field houses where turf is installed for athletic events and may be removed for storage between events.

BACKGROUND ART

Removable synthetic turf systems for arenas and field houses are known. Synthetic turf systems comprise rows of synthetic ribbons that extend vertically from a backing layer. The synthetic ribbons are designed to resemble grass and an infill layer of particulate material is often interspersed between the ribbons on the backing layer. In this arrangement, the synthetic ribbons are designed to extend a distance above the infill layer of particulate material. It is known in the prior art that the infill may comprise sand, rubber, a mixture of sand and rubber or other granulated particles such as TPE and EPDM rubber. The infill of particulate material provides resiliency to the surface and helps keep the ribbons in an upright position. Generally, the ribbons and backing of artificial turf known in the prior art is formed by tufting the ribbons through one or more layers of backing. The backing may comprise a single layer of material or multiple layers of material, and the individual layers may be either woven or nonwoven material. The tufting is generally done using a conventional tufting machine, which is a giant sewing machine with hundreds of needles. Multiple ends of yarn are fed to a bank of heavy needles with a span of twelve to fifteen feet. The tufting process involves a previously constructed primary backing passing under the needles and anchoring each stitch. The ribbons are thereby stitched into the backing fabric, leaving loops which form the turf pile. The pile may be loop pile, or cut pile or a combination of cut and loop introduced simultaneously in the turf by pushing off certain loops from the hook before they are cut. Once the ribbons are tufted in place through the primary backing, the backing is further coated on its back side with a urethane or latex coating, often referred to as a secondary backing, to help adhere the stitched ribbons to the backing member and to provide dimensional stability.

BRIEF SUMMARY OF THE INVENTION

With parenthetical reference to the corresponding parts, portions or surfaces of the disclosed embodiment, merely for the purposes of illustration and not by way of limitation, a cart (10) is provided for use with one or more rolls (700, 710A, 710B) of synthetic turf in connection with a synthetic turf storage and handling system. The cart comprises a frame (13) having a first longitudinal member (16A) with a first end (19) and a second end (22) opposite the first end (19). A support member (150) is disposed in a central portion of the frame (13). The support member (150) has at least one curved surface (153A, 153B) to form a cradle for receiving the one or more rolls (700, 710A, 710B) of synthetic turf.

A storage rack (500) is provided for receiving carts (10) suitable for storage of synthetic turf or for receive rolls of turf directly. The storage rack comprises a plurality of vertical support members (505A-D), a plurality of horizontal support members (510A-D) connected at opposite ends to the vertical support members, and a plurality of lateral support members (512, 515, 520) connecting each of the vertical support members to an opposed vertical support member. The vertical support members (505A, 505B) may be provided with wheels (507A-D) or the like for engaging with a track or channel (533A, 533B) in a support surface or floor (529).

A movable rack system (800) having a first row (810) having the number N−1 racks (500) is disposed in front of a second row (815) having N racks such that movement of the racks on the first row provides an opening in the first row to provide access to the racks on the second row. The movable rack system (800) provides for storing carts (10) with rolls of synthetic turf. A first row (810) of rack systems (500) contains N rack systems (500). An adjacent row (815) contains N−1 rack systems (500). The rack systems (500) in row (815) can be moved to the left or the right so that access to row (810) is available for loading and unloading rack systems (500) contained in that row.

A synthetic turf storage and handling system (900) is provided comprising a central hub (903) forming a central axis of rotation (906). A plurality of satellite frames or hubs (921) are disposed such that each satellite frame has an axis of rotation (918) disposed in spaced apart parallel relation to the central axis of rotation. Each satellite frame has a support structure for a roll of synthetic turf (700), the support structure capable of rotating about the axis of rotation. The central hub rotates about the central axis of rotation causing the satellite hubs or frames to rotate about the same axis, wherein each satellite hub is capable of rotating into a loading position where the support structure aligns with a spot above a support surface such that a roll of synthetic turf can be loaded onto the support structure by a fork lift traveling on the support surface, and wherein after the support structure on the satellite hub is loaded with a roll of synthetic turf, the central hub rotates until the next satellite hub is brought into loading position and the previously loaded satellite hub rotates into a storage position away from the support surface.

The hub may be located behind the seats in a stadium. The support structure on the satellite hub may be designed to support a cart (10) supporting a roll of synthetic turf, the cart having a plurality of wheels for rolling engagement with a support surface. The central hub may be held in position by support members (909) extending from a subfloor (912). The satellite hubs may be connected to the central hub by support beams (915) that rotate about the central hub. The central hub may rotate in either direction about the central axis of rotation. The support structures may rotate in either direction about the satellite hub. The satellite hubs may be connected together and to the central hub.

DESCRIPTION OF THE PREFERRED EMBODIMENTS

Figure 1:
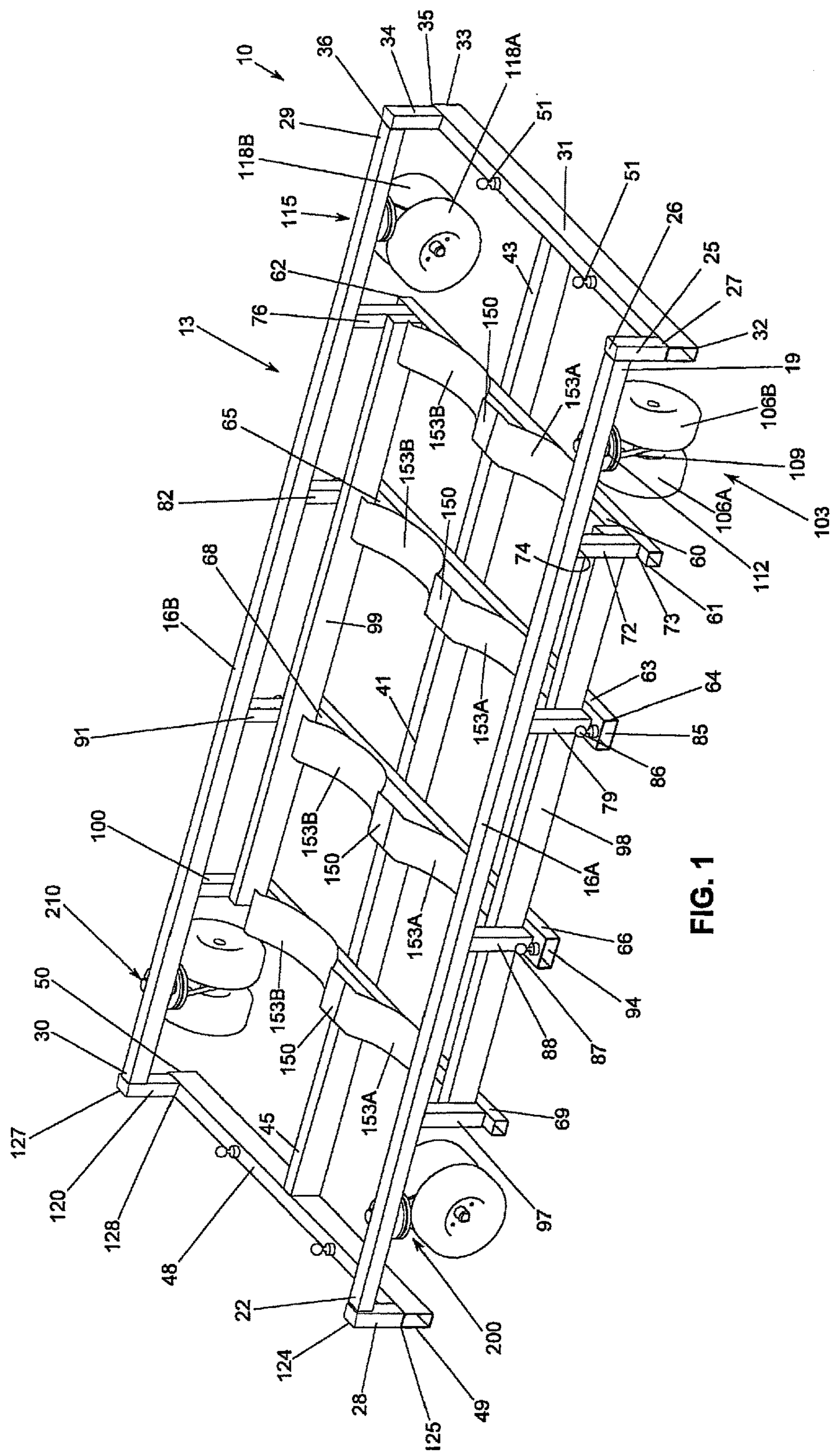
FIG. 1 is a perspective view of a cart for transport and storage of synthetic turf.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Removable synthetic turf systems are used in facilities that require a turf system that is easily removed and stored. An example of a typical facility is an arena/stadium where the installation and removal of a synthetic playing surface may be required between events being held at the arena/stadium. The arena/stadium may host numerous events including different sports requiring different playing surfaces (e.g. basketball, football, hockey, etc.) and also may host concerts, speeches, or the like between sporting events. Synthetic turf systems have been designed that utilize synthetic turf that may be stored in rolls. The playing surface may be divided into multiple sections of turf that are capable of being formed into rolls for transport and storage. For example, a portion of the playing surface may comprises several panels that may be rolled up for storage. The individual rolls formed from sections of the playing surface may be handled by a machine typically referred to as a spooler. The spooler may pay out the roll onto a support surface (either a concrete floor or a pad positioned on the floor) during installation and may wind the turf sections onto the spool during removal. Once the sections of the turf are rolled onto a spool, they may be removed from the spooler for storage. The spools containing rolled up sections of synthetic turf may be transported on a cart to a storage location. For ease of handling, the cart containing the spool of synthetic turf may be placed in a storage rack.

Synthetic turf systems generally comprise rows of synthetic ribbons that extend vertically from a backing layer. The synthetic ribbons are designed to resemble grass and an infill layer of particulate material is often interspersed between the ribbons on the backing layer. In this arrangement, the synthetic ribbons are designed to extend a distance above the infill layer of particulate material. It is known in the prior art that the infill may comprise sand, rubber, a mixture of sand and rubber or other granulated particles such as TPE and EPDM rubber. The infill of particulate material provides resiliency to the surface and helps keep the ribbons in an upright position. Generally, the ribbons and backing of artificial turf known in the prior art is formed by tufting the ribbons through one or more layers of backing. The backing may comprise a single layer of material or multiple layers of material, and the individual layers may be either woven or nonwoven material. The tufting is generally done using a conventional tufting machine, which is a giant sewing machine with hundreds of needles. Multiple ends of yarn are fed to a bank of heavy needles with a span of twelve to fifteen feet. The tufting process involves a previously constructed primary backing passing under the needles and anchoring each stitch. The ribbons are thereby stitched into the backing fabric, leaving loops which form the turf pile. The pile may be loop pile, or cut pile or a combination of cut and loop introduced simultaneously in the turf by pushing off certain loops from the hook before they are cut. Once the ribbons are tufted in place through the primary backing, the backing is further coated on its back side with a urethane or latex coating, often referred to as a secondary backing, to help adhere the stitched ribbons to the backing member and to provide dimensional stability.

Referring now to FIGS. 1-6, and initially to FIG. 1 thereof, a cart 10 is provided formed by a frame 13 constructed from suitable rigid materials such as metals, including but not limited to steel or the like. The structural members may be connected or attached to one another in numerous ways as will be evident to those of ordinary skill in the art based on this disclosure. For example, the means for connecting the structural members includes, but is not limited to, fasteners such as bolts, rivets, or the like; interconnecting mechanical members on the beams and posts that connect without fasteners; or by other methods such as welding.

The frame 13 includes a pair of longitudinal members 16A and 16B. With respect to the orientation of FIG. 1, member 16A is positioned in the front and member 16B is positioned in the rear of the cart 10. Members 16A and 16B may be disposed substantially parallel to each other as shown. Member 16A has a first end 19 and a second end 22 disposed opposite from the first end 19. Member 16B has a first end 29 and a second end 30 disposed opposite from the first end 29. Member 16A is connected to vertical member 25 at the first end 19 and is connected to vertical member 28 at the second end 22. Vertical member 25 has a first end 26 and a second end 27 disposed opposite from the first end 26. The first end 26 abuts with member 16A. The second end 27 is attached to a first lateral member 31 as shown on the right hand side of the figure. The first lateral member 31 has a first end 32 and a second end 33 disposed opposite from the first end 32. The first lateral member 31 extends from the front of the frame 13 where first end 32 connects to the second end 27 of the vertical member 25 to the rear where second end 33 connects with a vertical member 34. Vertical member 34 has a first end 35 and a second end 36 disposed opposite from the first end 35. First end 35 connects to the top of the first lateral member 31. The vertical member 34 extends upward from the first lateral member 31 where second end 36 connects to the first end 29 of the longitudinal member 16B.

A longitudinal support member 41 is connected to the first lateral member 31 at a position on or near the middle of the first lateral member 31. The longitudinal support member 41 has a first end 43 and a second end 45 disposed opposite from the first end 43. The first end 43 is attached to the first lateral member 31. The second end 45 is attached to a second lateral member 48 shown at the left side of the figure.

The first lateral member 31 is provided with one or more hitch balls 51. The hitch balls 51 may be provided for connecting to a trailer coupler (not shown) for using a tow vehicle (not shown) to pull and/or push the cart 10.

Moving toward the center of FIG. 1, a plurality of lateral members 60, 63, 66, and 69 are supported below longitudinal members 16A and 16B. Lateral members 60, 63, 66, and 69 are supported at or near the middle by longitudinal support member 41 which may be located underneath the lateral members to provide additional support. Lateral member 60 has a first end 61 and a second end 62 disposed opposite from the first end 61. A vertical member 72 having a first end 73 and a second end 74 is disposed between the lateral member 60 and the longitudinal member 16A. The first end 73 of the vertical member connects to the lateral member 60 at a portion disposed at or near the first end 61 of the lateral member 60. The second end 74 of the vertical member 72 is connected to the longitudinal member 16A. At the second end 62 of the lateral member 60, a vertical member 76 is disposed between the lateral member 60 and the longitudinal member 16B. Lateral member 63 is supported below longitudinal members 16A and 16B by vertical members 79 and 82. Lateral member 63 has a first end 64 and a second end 65 disposed opposite from the first end 64. Lateral member 63 may be comprised of a hollow tubular construction with an opening 85 at the first end 64. The opening 85 in the lateral member 63 is sized to receive one of the forks on a forklift for lifting the cart 10 to place it on a rack. Lateral member 63 may also be provided with a hitch ball 86 for connecting to a trailer coupler (not shown) for using a tow vehicle (not shown) to pull and/or push the cart 10. Lateral member 66 is the same size and configuration as lateral member 63. Lateral member 66 has a first end 67 and a second end 68 disposed opposite from the first end 67. Lateral member 66 is supported below longitudinal members 16A and 16B by vertical members 88 and 91. Lateral member 66 is comprised of a hollow tubular construction with an opening 94 at the first end 67. The opening 94 in the lateral member 66 is also sized to receive one of the forks. Lateral member 66 is also provided with a hitch ball 87 for connecting to a trailer coupler (not shown) for using a tow vehicle (not shown) to pull and/or push the cart 10. Lateral member 69 is supported between longitudinal members 16A and 16B by vertical members 97 and 100 as described above in connection with lateral member 60.

Longitudinal supports 98 and 99 are disposed across the lateral members 60, 63, 66, and 69 at the front and rear of the frame 13 as shown. The longitudinal support members 98 and 99 are disposed adjacent to vertical members 72, 79, 88 and 97; and 76, 82, 91, and 100, respectively. The lateral support members 60, 63, 66, and 69 provide support for a plurality of support members 150 having curved surfaces 153A and 153B providing a cradle for receiving and positioning the rolls of synthetic turf on the cart 10. The support members 150 are configured and arranged for supporting two rolls. Other configurations may also be suitable, including without limitation a singled curved surface forming a cradle for supporting a single roll. The support members 150 may be covered with a perforated material to provide for drainage from the rolls of turf. A plastic/polymer sheeting may be attached to the cart 10 to keep the metal from rusting and staining the turf and primarily to keep the roll 700, 710A, 710B cradled so that it is not damaged during storage.

As shown on the right hand side of the figure, between the first lateral member 31 and lateral member 60, a first swivel caster 103 has a pair of wheels 106A and 106B. The wheels 106A and 106B are mounted on a wheel assembly 109 configured and arranged to rotate about a swivel joint 112. The first swivel caster 103 is mounted underneath and supported from longitudinal member 16A. A second swivel caster 115 having wheels 118A and 118B is also mounted on longitudinal member 16B between lateral members 31 and 60.

On the left hand side of the figure, the second lateral member 48 is supported by vertical members 28 and 120. The second lateral member 48 has a first end 49 and a second end 50 disposed opposite from the first end 49. Vertical member 28 has a first end 124 and a second end 125 disposed opposite from the first end 124. Vertical member 120 has a first end 127 and a second end 128 disposed opposite from the first end 127. The first end 124 of vertical member 28 is attached to longitudinal member 16A, and the second end 125 of vertical member 28 is connected to the first end 49 of the second lateral member 48. The first end 127 of vertical member 120 is connected to longitudinal member 16B, and the second end 128 of vertical member 120 is connected to the second end 50 of the second lateral member 48.

Also on the left side of the figure, the second end 45 of the longitudinal support member 41 is connected to the second lateral member 48. In addition a third swivel caster 200 and a fourth swivel caster 210 are provided at the second end of longitudinal member 16A and longitudinal member 16B. The swivel casters 103, 115, 200 and 210 are all disposed at a position spaced apart from the ends of the frame 13 and therefore within the overall dimensions of the frame 13.

Figure 2:
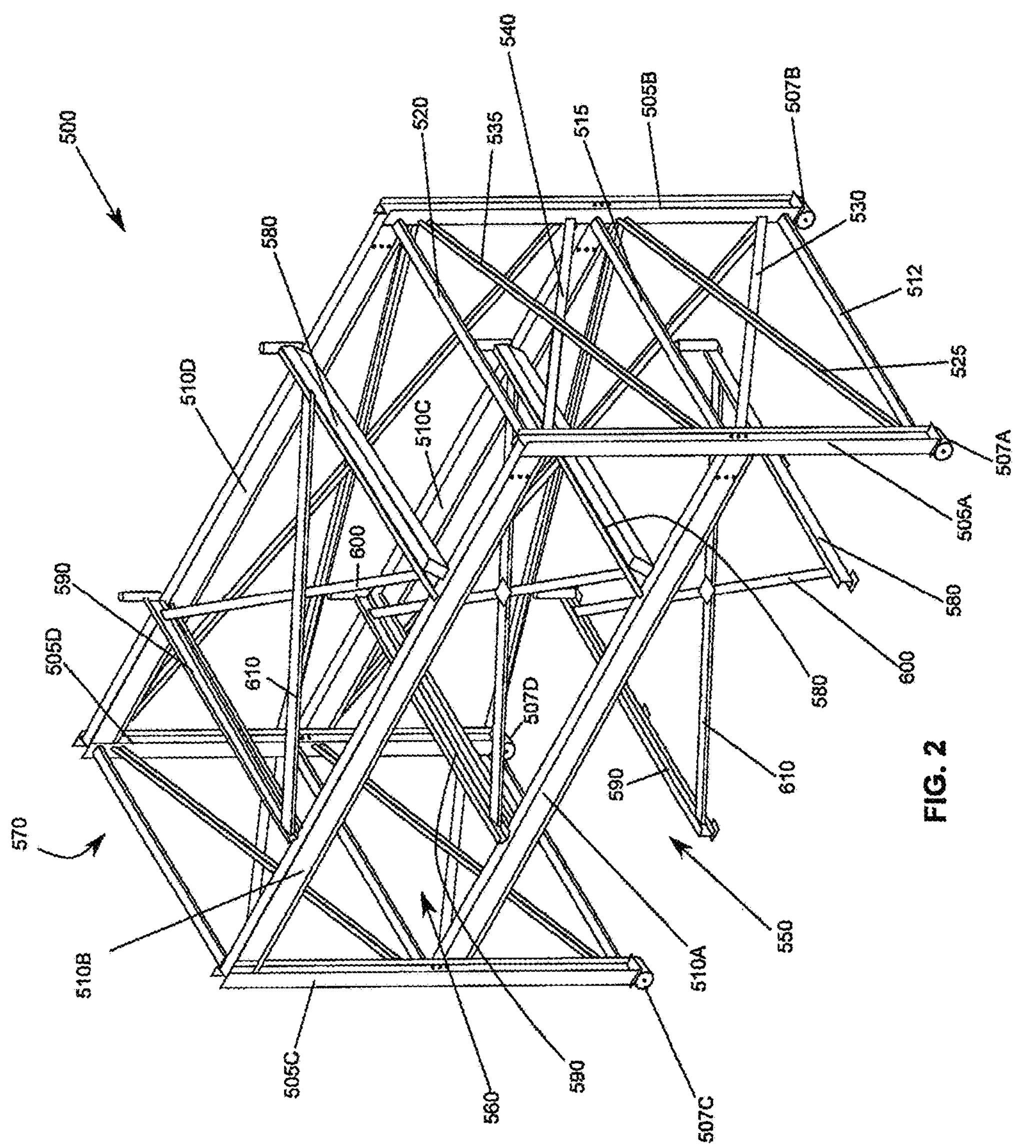
FIG. 2 is a perspective view of a rack for storing synthetic turf.

Referring to FIG. 2, a storage rack system 500 includes a system of vertical support members 505A-D and horizontal support members 510A-D. The structural members may be connected or attached to one another in numerous ways as will be evident to those of ordinary skill in the art based on this disclosure. For example, the means for connecting the structural members includes, but is not limited to, fasteners such as bolts, rivets, or the like; interconnecting mechanical members on the beams and posts that connect without fasteners; or by other methods such as welding. As shown on the right side of the figure, a first vertical support member 505A is disposed in spaced apart relation to a second vertical support member 505B. The vertical support members 505A and 505B are connected by a plurality of lateral support members 512, 515, and 520. Between the lateral support members 512 and 515, a pair of diagonal braces 525 and 530 may be attached to the structure. Another set of diagonal braces 535 and 540 may be attached to the structure between the lateral support members 515 and 520. The vertical support members 505A-D may be provided with wheels 507A-D or the like for engaging with a track or channel in the support surface or floor. The wheels 507A-D may provide for movement of the rack system 500 relative to the support surface.

The horizontal support members 510A, 510B, 510C, and 510D may extend from one end to the other end of the storage rack system 500. The left hand side of the rack system 500 is constructed as described above in connection with the right hand side. Accordingly, vertical support members 505C and 505D are provided with lateral support members and diagonal braces and are connected to the horizontal support members 510A-510D. The structure shown forms three spaces for receiving carts 10. The first space 550 is bordered by the floor at the bottom. The second space 560 is bordered by the horizontal support members 510A-D and by the vertical support members 505A-D. Finally, a third space 570 is provided at the top of the rack system 500.

As shown in the middle of the figure, a pair of upstanding members 580 and 590 are disposed in spaced apart relation.

The upstanding members 580 and 590 are substantially parallel to each other and are spaced apart from the ends of the rack system 500. The upstanding members 580 and 590 may be connected by diagonal support members 600 and 610 to provide for additional structural support. The upstanding members 580 and 590 are designed to engage with portions of the frame 13 of the carts 10 such that the carts 10 can be placed onto the rack system 500 with a forklift (not shown), and the cart 10 is not supported by the wheels on the swivel casters during storage so it will not roll.

Figure 3:
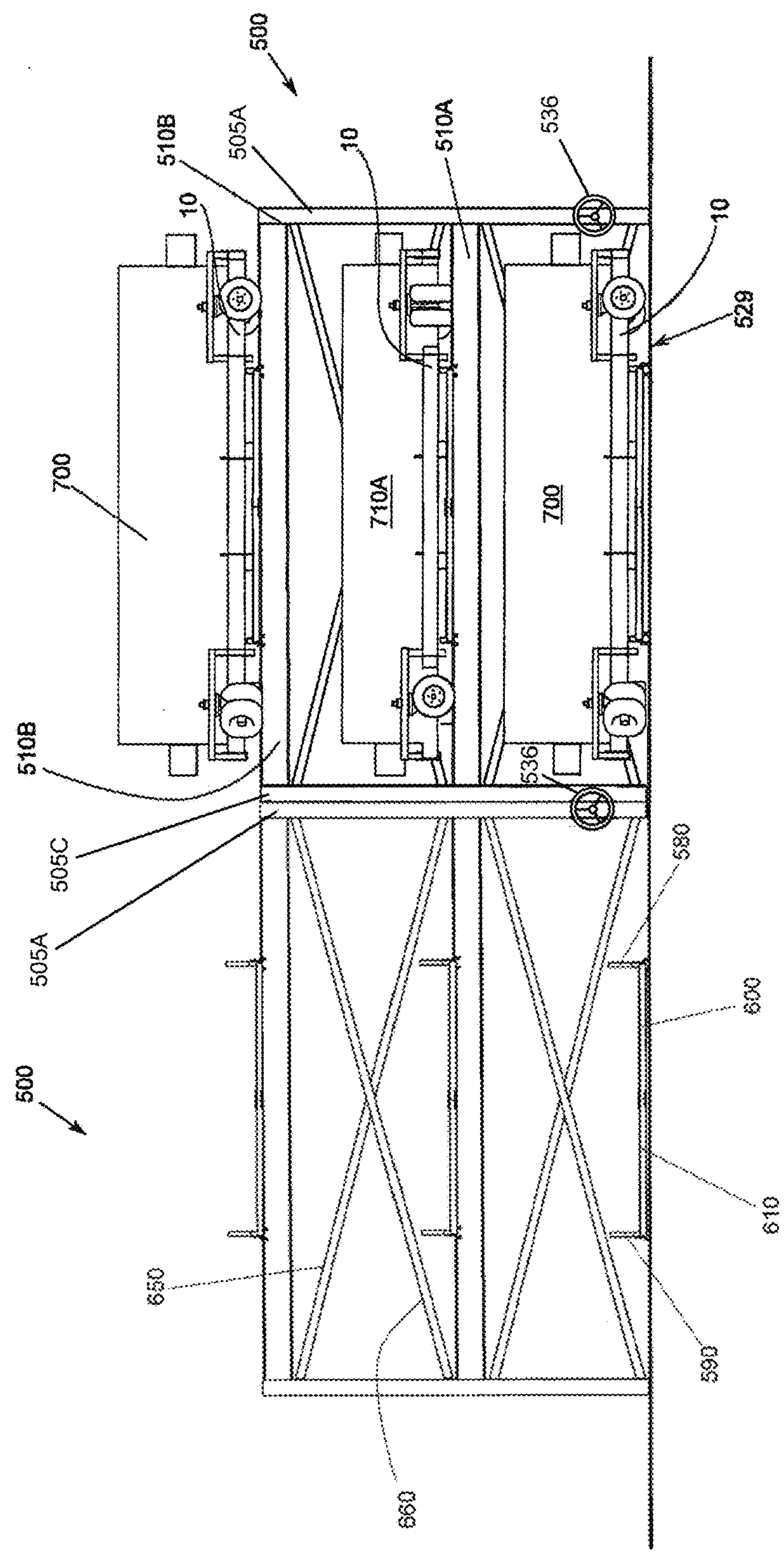
FIG. 3 is a front elevational view of a pair of movable racks in a turf storage system according to a first embodiment of the invention.
Figure 4:
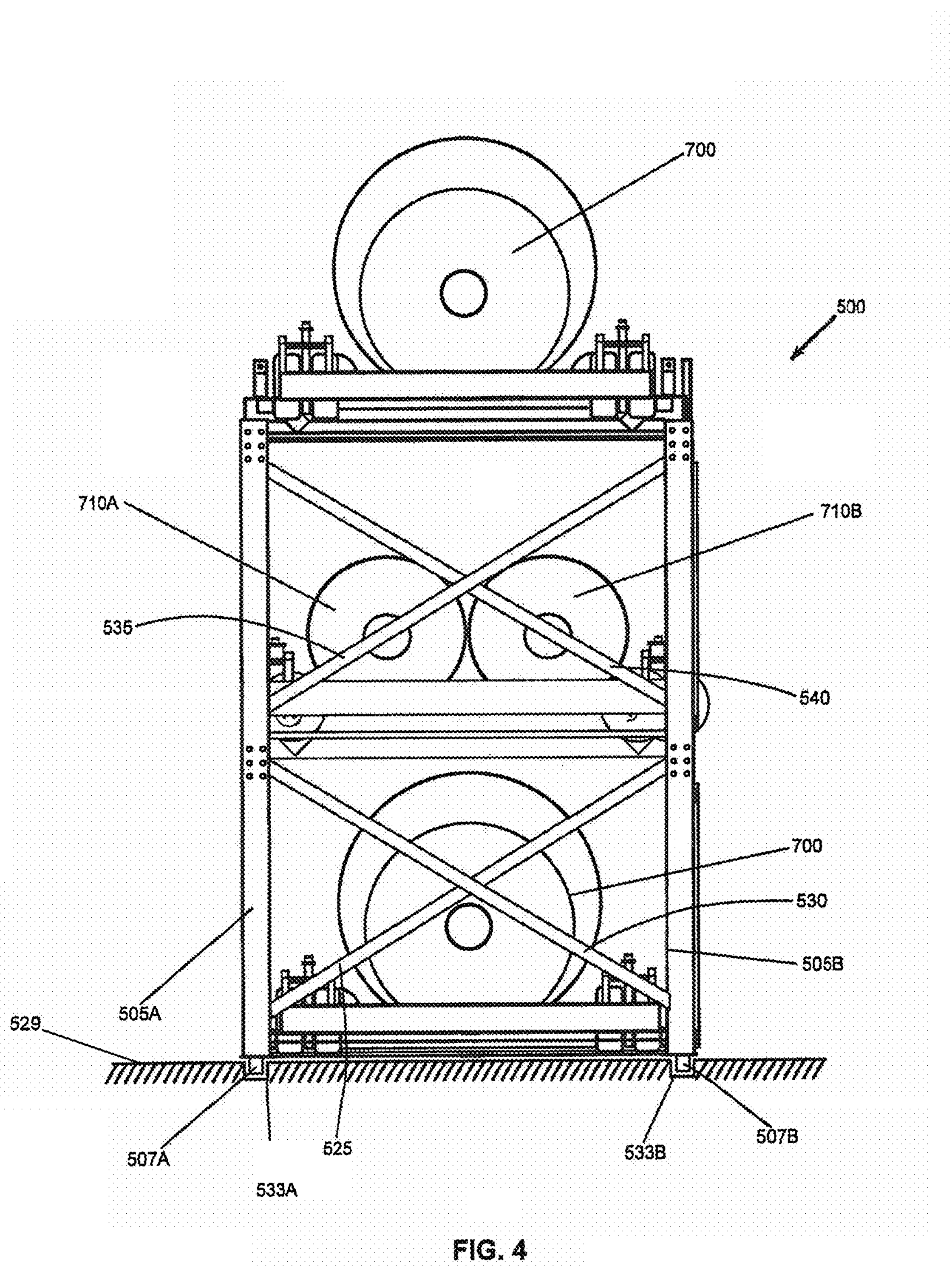
FIG. 4 is a side elevational view of the rack shown in FIG. 3.
Figure 7A:
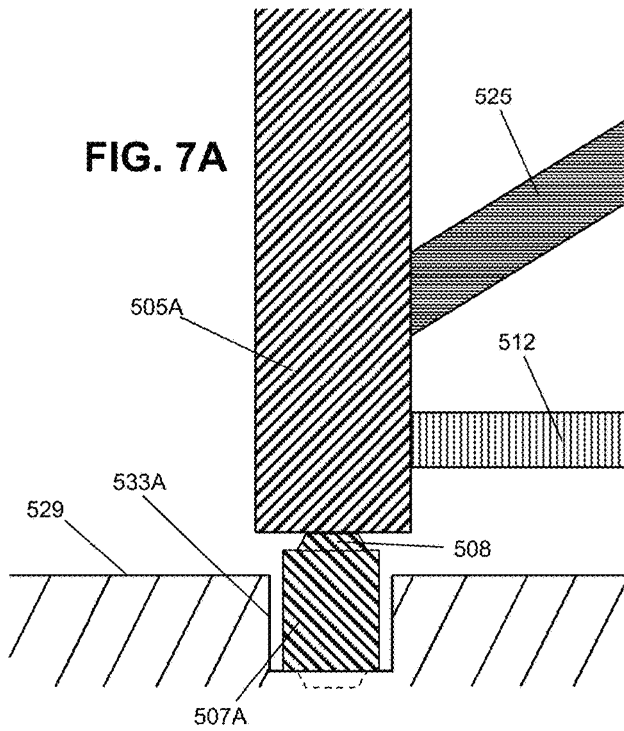
FIG. 7A is an enlarged sectional view of the storage rack wheel and support surface channel shown in FIG. 4.
Figure 7C:
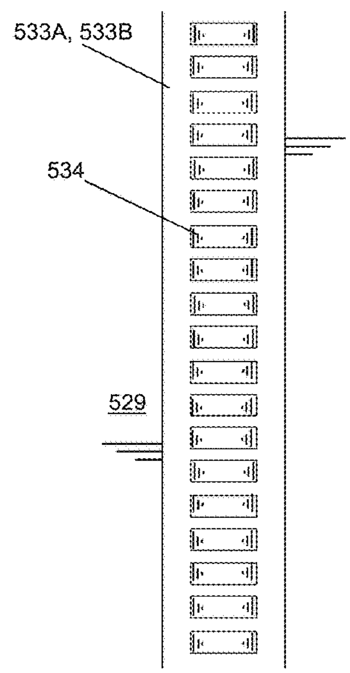
FIG. 7C is an enlarged top view of the channel shown in FIGS. 4, 7A, and 7B.
Figure 7B:
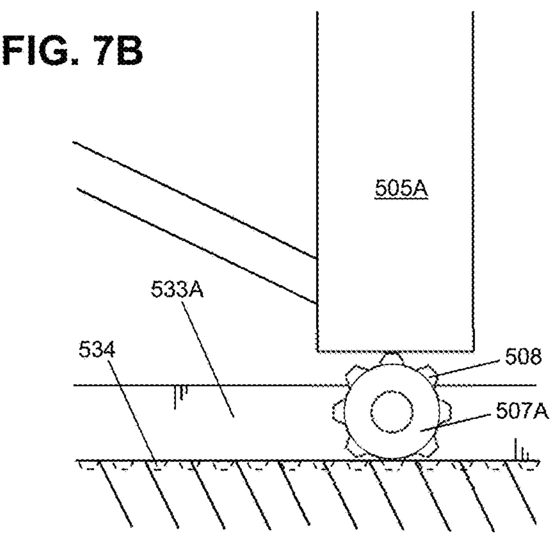
FIG. 7B is a side view of the storage rack wheel and support surface channel shown in FIGS. 4 and 7A.

Turning to FIG. 3, a pair of rack systems 500 are disposed side-by-side. The rack systems 500 may be supported above support surface 529, which may be a concrete floor or the like. As shown in FIG. 4, the support surface 529 is provided with channels 533. The channels 533A and 533B are sized to receive the wheels 507A-D such that the rack system 500 may be moved to the left or right with respect to the orientation shown in FIG. 3. In an embodiment, the channels 533A and 533B are provided with a track 534 or other suitable means for conveying the rack system 500 in either direction relative to the support surface 529. In an embodiment, as illustrated in FIGS. 7A-7C, the rack wheels 507A-D include teeth 508 for engaging the track 534. As illustrated in FIG. 3, the rack system 500 may include a handwheel 536 thereon operable to convey the rack system 500 along the track 534. The rack system 500 on the right hand side of FIG. 3 is shown supporting carts 10 with rolls 700, 700A, and 700B, respectively, disposed thereon for storage of synthetic turf.

In FIG. 4, the right side of racks 500 in FIG. 3 is shown. Wheels 507A and 507B are disposed in channels 533A and 533B, respectively. The wheels 507A and 507B are freely rotating or may be power assisted as will be evident to those of ordinary skill in the art based on this disclosure. Alternatively, the rack system 500 may be provided with translatory motion by means of a rack and pinion or other gear arrangement as will be evident to those of ordinary skill in the art based on this disclosure. Other mechanical systems for producing translatory motion of the rack system 500 relative to the support surface 529 may also be suitable.

Figure 5:
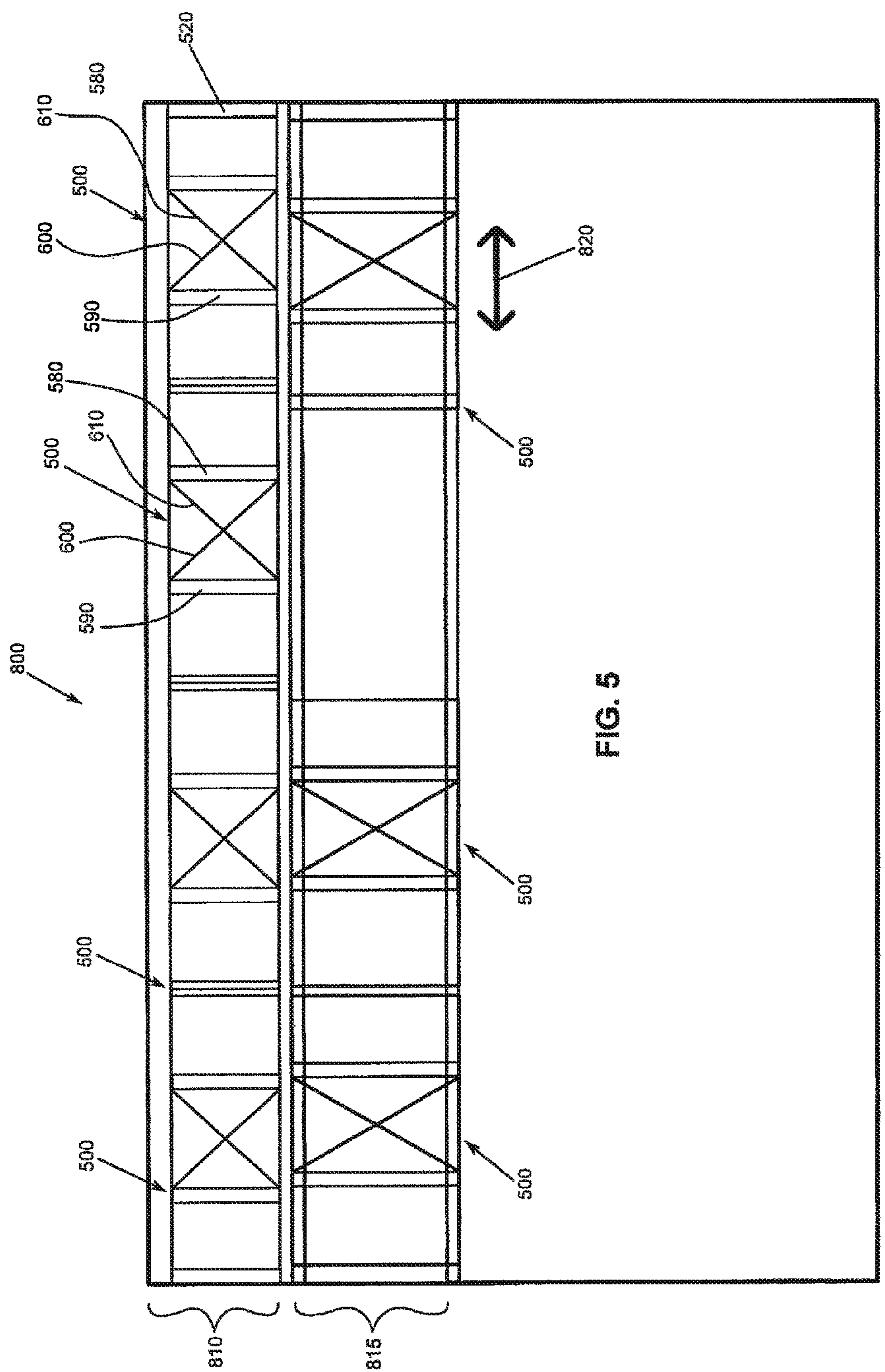
FIG. 5 is a top plan view of the synthetic turf storage system of the first embodiment.

Turning to FIG. 5, a movable rack system 800 provides for storing carts 10, shown in FIG. 1, containing rolls of synthetic turf. FIG. 5 is a top plan view of the movable rack system 800. A first row 810 of rack systems 500 is shown at the top of the figure. In row 810, four individual rack systems 500 are disposed in a row from the left to right with respect to the orientation of the figure. Each individual rack system 500 may accept up to three carts 10 as shown in FIG. 3. Other arrangements with more or less than three spaces for carts 10 may also be configured. Row 810 contains four rack systems 500. An adjacent row 815 of rack systems 500 contains three movable rack systems 500. The rack systems 500 in row 815 can be moved to the left or the right with respect to the orientation of the figure such that access to row 810 is available for loading and unloading racks systems 500 contained in that row. It will be evident to those of ordinary skill in the art based on this disclosure that additional rows may be added in front of row 815 to increase the storage capability of the system 800. The example shown includes four rack systems 500 in row 810 and three rack systems 500 in the adjacent row 815. However, the system 800 may include any number N of rack systems 500 disposed in a row so long as the adjacent row has a maximum of N−1 rack systems 500. Additional rows may also have up to N−1 rack systems 500 so that access to the first row 810 can be made through multiple rows of rack systems 500.

Figure 6:
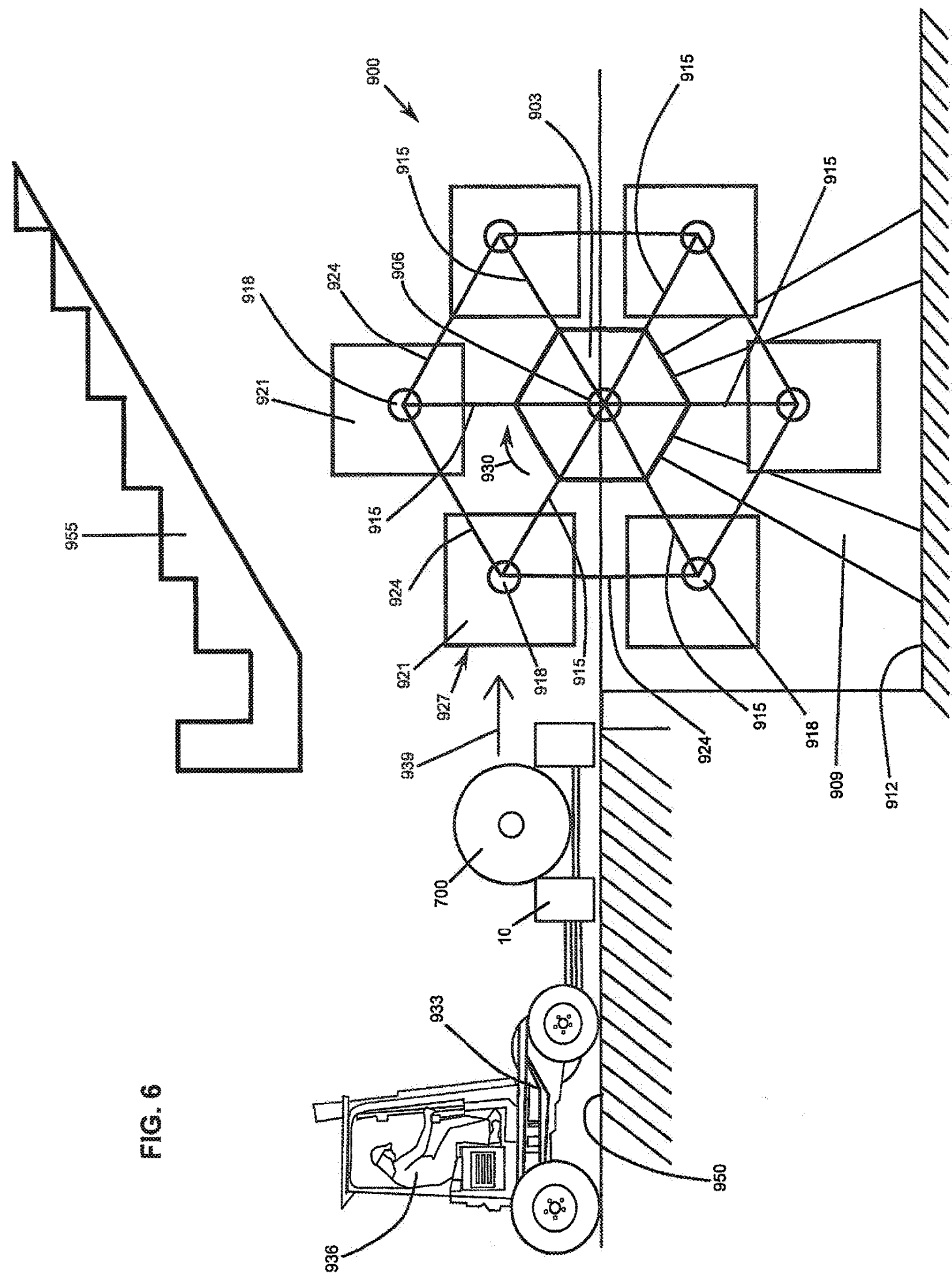
FIG. 6 is a diagrammatic view of a second embodiment of the synthetic turf storage system.

An alternate embodiment is shown in FIG. 6 that provides a rotating storage system 900. The rotating storage system 900 includes a rotating hub 903 rotating on an axle 906 about an axis of rotation normal to the page in FIG. 6. The axle 906 is supported on bearings disposed on a support structure 909. The support structure 909 is constructed of a suitable strong rigid material such as steel and is supported from a support surface 912 such as a concrete floor. The hub 903 has spokes 915 attached thereto that extend radially from the hub 903. The spokes 915 connect to support structures that support frames 921 on axles 918. The axles 918 are supported by bearings. The support frames 921 rotate into position where they receive carts 10 containing rolls of synthetic turf (or alternatively may receive rolls of synthetic turf directly) as described in greater detail below. The spokes 915 are connected together by braces 924 for structural support. The frame 921 has an opening 927 disposed facing outside such that rotation of the hub 903 in the direction of arrow 930 causes the opening 927 to align with a cart 10 for loading from a forklift 933 being driven by an operator 936. The cart 10 containing a roll 700 (or alternatively just a roll 700 itself) is loaded into the system 900 in the direction of arrow 939. After the cart 10 is loaded, the system 900 may be rotated such that another frame 921 is rotated into a loading position. The process continues until all of the frames 921 on the rotating system 900 are filled with carts 10. Support surface 912 may be disposed beneath the surface 950 of the arena for storage beneath the seating area 955.

The present invention contemplates that many changes and modifications may be made. Therefore, while the presently-preferred form of the synthetic turf storage and handling system has been shown and described, and several modifications and alternatives discussed, persons skilled in this art will readily appreciate that various additional changes and modifications may be made without departing from the scope of the invention.

What is claimed is:

1. A synthetic turf storage and handling system, comprising:

a plurality of storage racks, each storage rack having
- a plurality of vertical support members, wherein the plurality of vertical support members define a height the storage rack,
- a plurality of horizontal support members connected at opposite ends to the vertical support members, wherein the plurality of horizontal support members define a width of the storage rack,
- a plurality of lateral support members connecting each of the vertical support members to an opposed vertical support member, wherein the plurality of lateral support members define a depth of the storage rack, wherein the width of the storage rack is greater than the depth of the storage rack,
- a plurality of wheels attached to the bottom thereof, and
- a first cart receiving space and a second cart receiving space therein, wherein the second cart receiving space is disposed above the first cart receiving space;

a support surface having a first pair of parallel channels disposed therein for receiving the wheels of one or more storage racks in a first row, whereby the one or more storage racks are operable to translate along the first pair of parallel channels;

a cart having a plurality of wheels operable to translate the cart, and at least one curved surface at least partially defining a cradle operable to receive and support a roll of synthetic turf;

wherein the cart is operable to be selectively inserted into or removed from one of the cart receiving spaces via a side opening thereof having an opening width greater than the depth of the storage rack;

the first row of storage racks having N−1 of the storage racks disposed in the first pair of parallel channels;

a second row of storage racks having N of the storage racks, wherein movement of the storage racks in the first row along the first pair of parallel channels provides access to the side opening of at least one storage rack in the second row, wherein the cart is inserted or removed from one of the cart receiving spaces via the side opening.

2. The synthetic turf storage and handling system of claim 1, wherein each rack comprises at least two upstanding members disposed in spaced apart relation.

3. The synthetic turf storage and handling system of claim 2, wherein the upstanding members are parallel to each other and spaced away from the ends of the rack.

4. The synthetic turf storage and handling system of claim 3, wherein the upstanding members are operable to engage with portions of the cart frame, whereby the cart is operable to be selectively inserted or removed from one of the cart receiving spaces by a forklift.

5. The synthetic turf storage and handling system of claim 3, wherein the upstanding members selectively engage the frame of the cart, whereby the cart wheels are not operable to translate the cart.

6. The synthetic turf storage and handling system of claim 1, wherein the support surface has a track disposed thereon.

7. The synthetic turf storage and handling system of claim 6, wherein the first pair of parallel channels each include a track, and the wheels on the racks have teeth for engaging with the track.

8. The synthetic turf storage and handling system of claim 7, wherein each rack has a handwheel disposed thereon for conveying the rack along the channel track in the support surface.

9. The synthetic turf storage and handling system of claim 1, wherein the first cart receiving space and the second cart receiving space each have an open bottom.

10. The synthetic turf storage and handling system of claim 9, wherein the upstanding members in the first cart receiving space are disposed directly on the support surface.

11. The synthetic turf storage and handling system of claim 1, further comprising a second pair of parallel channels disposed in the support surface parallel with the first pair of parallel channels, whereby one or more storage racks are operable to translate along the second pair of parallel channels.

12. The synthetic turf storage and handling system of claim 11, wherein the second row of storage racks is disposed in the second pair of parallel channels.

13. The synthetic turf storage and handling system of claim 11, each storage rack further comprising a third cart receiving space disposed above the second cart receiving space.

* * * * *